United States Patent [19]

Bechu

[11] Patent Number: 4,603,843
[45] Date of Patent: Aug. 5, 1986

[54] RUBBER MOUNT WITH ELASTIC CONTROL

[75] Inventor: Jean-Pierre Bechu, Courbevoie, France

[73] Assignee: Caoutchouc Manufacture et Plastiques, France

[21] Appl. No.: 603,157

[22] Filed: Apr. 23, 1984

[30] Foreign Application Priority Data

Apr. 22, 1983 [FR] France .................. 83 06613

[51] Int. Cl.[4] .................. F16F 13/00
[52] U.S. Cl. .................. 267/35; 267/64.28; 280/712
[58] Field of Search ............ 267/22 R, 35, 64.16, 267/64.17, 64.28, 140.1, 151; 280/704, 710, 712, 714

[56] References Cited

U.S. PATENT DOCUMENTS

| | | | |
|---|---|---|---|
| 2,930,607 | 3/1960 | Hutzenlaub | 267/35 |
| 4,206,934 | 6/1980 | McKee | 280/714 X |
| 4,273,358 | 6/1981 | Taft | 280/714 X |
| 4,401,298 | 8/1983 | Eaton et al. | 267/35 X |

Primary Examiner—Duane A. Reger
Attorney, Agent, or Firm—Antonelli, Terry & Wands

[57] ABSTRACT

A vibration insulation arrangement for a load which includes a rubber mount formed with a rubber enclosure adapted to alter its shape, and with modulated auxiliary pressure that when displacements of the mount occur an active absorption is provided by a rapid communication of an interior of the rubber enclosure with two additional enclosures which are maintained at preadjusted pressures in order to exert a predetermined pressure so as to provide for a vibration damping of the load.

13 Claims, 7 Drawing Figures

RUBBER MOUNT WITH ELASTIC CONTROL

The present invention relates to an insulation arrangement and, more particularly, to a vibration insulation or damping arrangement for fixed machines, motor vehicles, trucks, rail vehicles, and ships with the vibration insulation or damping arrangement utilizing compressed air.

Suspension systems have been proposed which immediate correct forces of movement as soon as they are detected. A disadvantage of the proposed systems resides in the fact that the immediate regulating effects lead to a prohibitive consumption of fluid or compressed air by causing accelerating correcting forces which are greater than comfort allows.

Conventional vehicle pneumatic suspension systems provide an elastic union that, due to its flexibility, dampens or filters out the necessary amount of vibrations; however, conventional vehicle suspension system require outside means for absorbing or damping the vibrations in order to avoid an unnecessary consumption of, for example, compressed air, with such means being adapted to slowly correct the pressure to balance variable loads over an average of several cycles of oscillation.

Variations of conventional pneumatic suspension systems include the utilization of a thick elastomer enclosure which incorporates reinforcing means, with a change of shape of the enclosure making it possible to carry a portion of the load and, in particular, a minimum value or empty weight of a vehicle. To provide assistance for these proposed suspension systems, a variable air pressure is employed for the static load which rapidly follows variations in the load as compared to proportionally adjusting the suspension system to the effects of the load.

Suspension systems of the aforementioned type are used, for example, in railway suspensions where regulating the pressure in an enclosure performs a function of a nearly constant pneumatic suspension with a volume, with very slow variations compared to the frequency itself, that is provided by conventional outside regulating means. The regulator means supply a variable volume of the vibration insulation or damping arrangement by supplying pressure through an intake line or releasing the same to the atmosphere so as to form a stabilizer valve arrangement. If the connection or communication between the intake line or the atmosphere occurs quickly through high capacity lines, the suspension is a simple regulation of the level in case of sudden corrections and, if there is not absorption of the vibrations, the load will float since it is subjected to oscillations.

While it is proposed to provide intake and outlets for the regulators which permit only a very small flow through the use of ports of a relatively small diameter so as to limit a correction of the regulator to a very low value for each oscillation, a disadvantage of this proposal resides in the fact that the pneumatic suspension which is created only results in a slight absorption of the oscillations. However, with, for example, passenger or commercial motor vehicles or railway vehicles, it is necessary to provide a high flexibility by adding relatively large additional enclosures so as to limit the oscillation cycles by progressive closure thereby ensuring an efficient auxiliary absorption.

The aim underlying the present invention essentially resides in providing a vibration insulation or damping arrangement which reconciles the advantages of a rubber-base pneumatic suspension system for correcting a seating or leveling during load variations with those of a true pneumatic suspension system, in which absorption of vibrations is sought by consuming energy by an expansion of compressed air through rapid modulation of the auxiliary pressure so as to eliminate the disadvantages of air consumption and related absorption problems.

In accordance with advantageous features of the present invention, a variable volume chamber, formed by an encasement of, for example, a thick rubber material having reinforcement means therein, is adapted to be quickly connected or communicated through a stabilizer valve, during time periods beyond a static phase of the load, to one of two additional enclosures, with one of the additional enclosures being adjusted or regulated to a greater pressure while the other enclosure is adjusted or regulated to a moderate pressure.

In accordance with the present invention, the pressures are calculated so that after a connection or communication is effected, a sum of the combined air masses of the enclosures has a pressure that acts on an active surface of the vibration or damping insulation arrangement at approximately 0.90 and 1.10 times the value required for balancing of the load.

At the end of each half oscillation, the regulator must attempt to re-establish the initial pressure or attempt to re-establish a difference with the pressure in the work volume at that time, with the two actions being identical. During this time, the pressure in the inside volume is decreased before a connection or communication is made to the additional enclosure having the reduced pressure, and a symmetrical phenomenon occurs for the compression half-cycle. The pressure is re-established by employing a port means having a very slight or small flow or a lower pressure differential than in conventional constructions between a line supplying the pressure or the atmosphere and the additional enclosures. Consequently, less energy is consumed by a construction in accordance with the present invention.

In accordance with still further features of the present invention, the enclosure forming a variable volume chamber is formed by two conically shaped encasements disposed in vertical juxtaposition, with the conical encasements being arranged so that the flexibility thereof are disposed in series in order to enable a carrying of a suspended load.

Preferably, a rapid connection or communication valve provided between the respective volumes is integrated into an interior of the enclosure forming the variable volume chamber.

Moreover, the additional enclosure accommodating or having the initially greater pressure is formed of an encasement means having a cross section which enables the same to alter its shape thereby making it possible to control an adjustment of a pressure.

Advantageously, in accordance with still further features of the present invention, at least one encasement means of the additional enclosure accommodating the moderated pressure or a pressure which is slowly brought up to atmospheric pressure, is fashioned from a material that is adapted to alter its shape such as, for example, a cellular elastomer having a slight permeability distributed over its entire surface.

If the arrangement of the present invention is utilized on a passenger or commercial motor vehicle, advantageously the suspension is disposed on the left and right of the motor vehicle with either one or two common enclosures in order to provide for an anti-roll stability, even if the balance pressures in the inside enclosures or variable volume chambers are slightly different when the loads are not properly centered.

These and other objects, features, and advantages of the present invention will become more apparent from the following description when taken in connection with the accompanying drawings which show, for the purpose of illustration only, two embodiments in accordance with the present invention.

Figure 1:
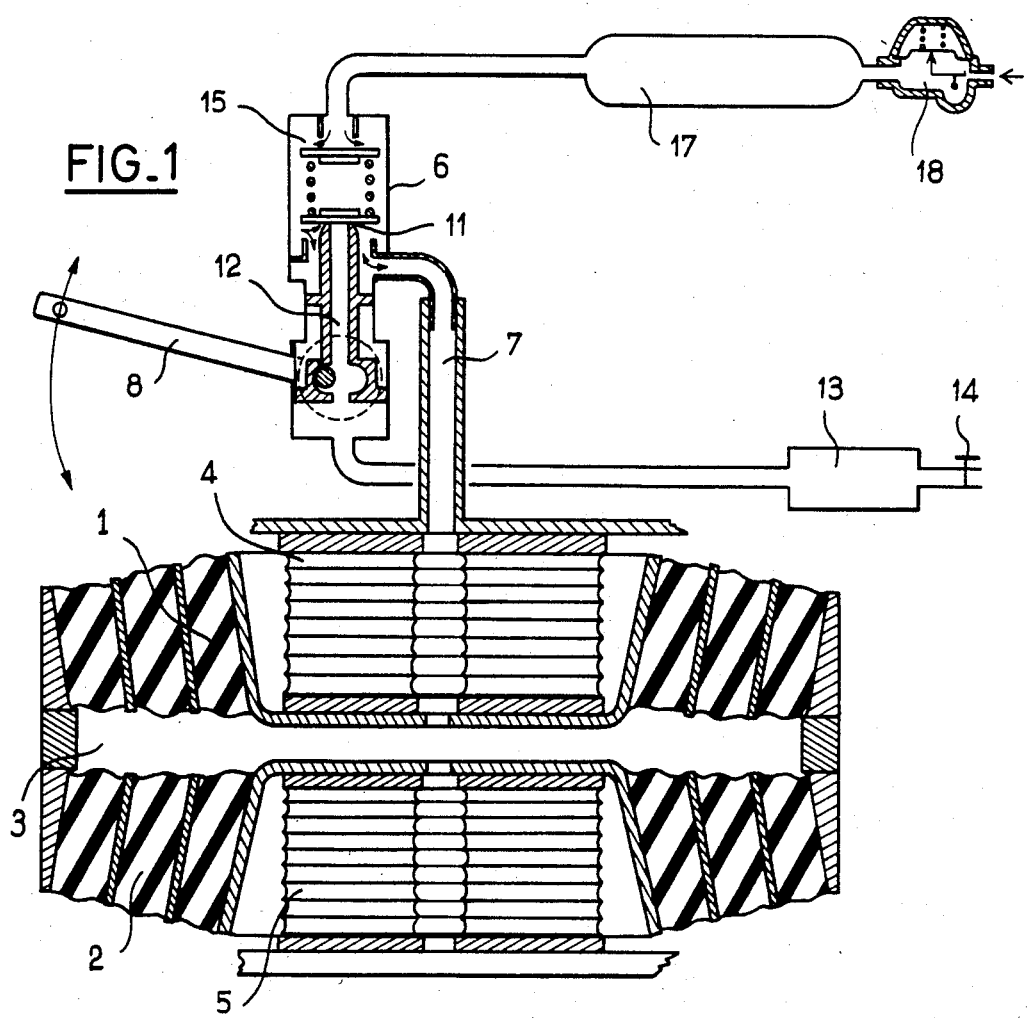
FIG. 1 is an axial cross-sectional partially schematic view of a vibration damping or insulation arrangement constructed in accordance with the present invention for a rail vehicle suspension system.

Referring now to the drawings wherein like reference numerals are used throughout the various views to designate like parts and, more particularly, to FIG. 1, according to this figure, a rail suspension system incorporating a vibration damping or insulating arrangement in accordance with the present invention includes a pair of series disposed vertically juxtaposed conical spring members 1, 2 for carrying or supporting a load applied to horizontal support members 4, 5 formed, for example, by a plurality of resilient disc shaped members which provide a necessary horizontal elasticity, with the conical spring members being joined to each other and enclosing a variable volume chamber 3 that is as small as possible. The conical spring members 1, 2 are connected to a conventional stabilizing regulator means 6 through a duct or conduit 7 for enabling a supply of a pressure medium to the variable volume chamber 3. The stabilizing regulator means 6 includes a measuring lever means 8 connected through a conventional connecting rod assembly to a load for sensing or measuring a level of the load. Unlike conventional constructions wherein an intake of the pressure regulator means 6 occurs through a seated or biased valve 15 an outlet through a valve 11 closing a duct so as to control a feeding of a line pressure and a venting to the atmosphere, according to the present invention, additional enclosures or accumulators 13, 17 are provided for respectively storing or accumulating a pressure adapted to act upon the respective valves 11, 15.

The additional enclosure 17 is supplied with a pressure through a pressure reducer 18 interposed between a supply pressure source (not shown) and the enclosure 17, with the pressure reducer 18 being adapted to enable a progressive re-establishing of a greater pressure in the additional enclosure 17 so that a sum of the volume of the variable volume chamber 3 and the enclosure 17 exerts a pulling force which is 1.10 times a weight of the suspended load or mass. The duct 12 enables an expansion to take place in the additional enclosure 13, which enclosure is preset or previously adjusted to a pressure controlled or moderated by a pressure reducer 14 which, for example, may represent nothing more than a regulated leak. The pressure is calculated so that as soon as the valve 11 opens, a pulling force of 0.9 times a weight on the suspended load or mass in the sum of the volumes of the variable volume chamber 3 and enclosure 13 occurs.

Since an advantage of a pneumatic system is the ability thereof to adapt to variable loads, the balance pressure in the variable volume chamber 3 can be obtained by indexing or controlling the pressure reducer 18 so as to measure the load either by a sensor (not shown) or by a slow transmission of an average pressure in the variable volume chamber 3. This makes it possible to index the load or mass to the pressure reducer 14 which regulates the pressure in the additional enclosure 13 to a very moderate pressure. As can readily be appreciated, in order to provide for a controlled leakage of the pressure, it is possible for all or a portion of the encasement forming the additional closure 13 to be porous and, for example, the encasement for the additional enclosure 13 may, if necessary, be of the type that is adapted to change shapes as long as it is made from a cellular elastomer. Similarly, depending upon the particular application of the arrangement of the present invention, either the enclosure 17 and/or the enclosure 13 may be combined between a left suspension and right suspension of the load so as to provide for an anti-rool stability even if the balance pressures in each of the left or right enclosure 3 differs slightly under a poorly centered load.

Figure 2:
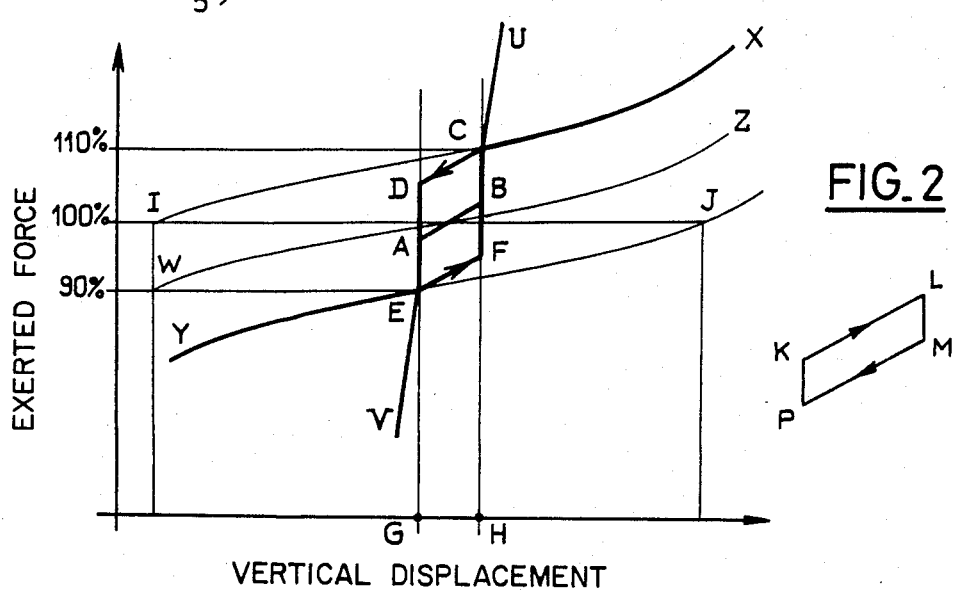
FIG. 2 is a graphical illustration of a vertical displacement of the arrangement of the present invention with forces exerted by the arrangement on a suspended mass or load.

As shown most clearly in FIG. 2, within the limits designated G, H, where connections or communications are opened to one of the two additional enclosures 17, 13, the air mass enclosed in the working variable volume chamber 3 makes the overall suspension system firm due to the relatively small volume of the variable volume chamber 3. This stability is illustrated by a segment A-B when there is a balance with the nominal load, which moves in the parallel manner in the direction D-C or E-F if the connection or communication has increased or decreased the air mass.

In addition to establishing or opening one connection or communication or the other, assuming that the regulation which re-establishes prior pressures takes place slowly as compared to a cycle of the oscillations of the load or mass, the balance of the load or mass may best be described by a polytropic curve to the total volume C-X or E-Y. In the opposite case or when a regulation of the level of the load or mass occurs immediately, the forces brought into play are shown by the reference characters C-U or E-V, with correcting accelerations of the movement that are exaggerated in comparison to, for example, a required comfort for a passenger of the vehicle employing the suspension system.

For displacements greater than G-H, the comfort experienced in a body of the vehicle is therefore made equal to that of a highly flexible pneumatic suspension system that would allow the suspension along the curve W-Z parallel to the two polytropic curves C-X and E-Y. The suspended mass or load is alternately brought back toward the points I and J which are of virtual balance with a constant air mass.

The difference in behavior with an arrangement of the present invention is the active action absorbed in a given cycle. If the connection or communication closes at the position H, the expansion of the variable volume chamber 3 follows the relatively steep slope C-D. Conversely, with compression beginning at the point G, the arrangement follows the slope E-F until the other connection or communication with the additional enclosure occurs. The action supplied against the load or mass is illustrated by the area of the parallelogram E-F-C-D, going counterclockwise, contrary to a hysteresis cycle that transforms this lost energy into heat by following the parallelogram K-L-M-P, which represents a friction absorption or an ellipse for a viscous absorption of a rubber enclosure. In a periodic sinusoidal movement, both diagrams would be in phase opposition. If the pressures have no time to re-establish themselves, the parallelogram E-F-C-D will be reduced to a segment A-B, and an experimental adjustment of the ports communicating the enclosures with the variable volume chamber 3 makes it possible to select or arrive at a compromise desired for the absorption or damping of vibrations without increasing the acceleration forces that occur until the unknown impacts of the surface over which the vehicle is traveling is corrected in a periodic manner.

Figure 3:
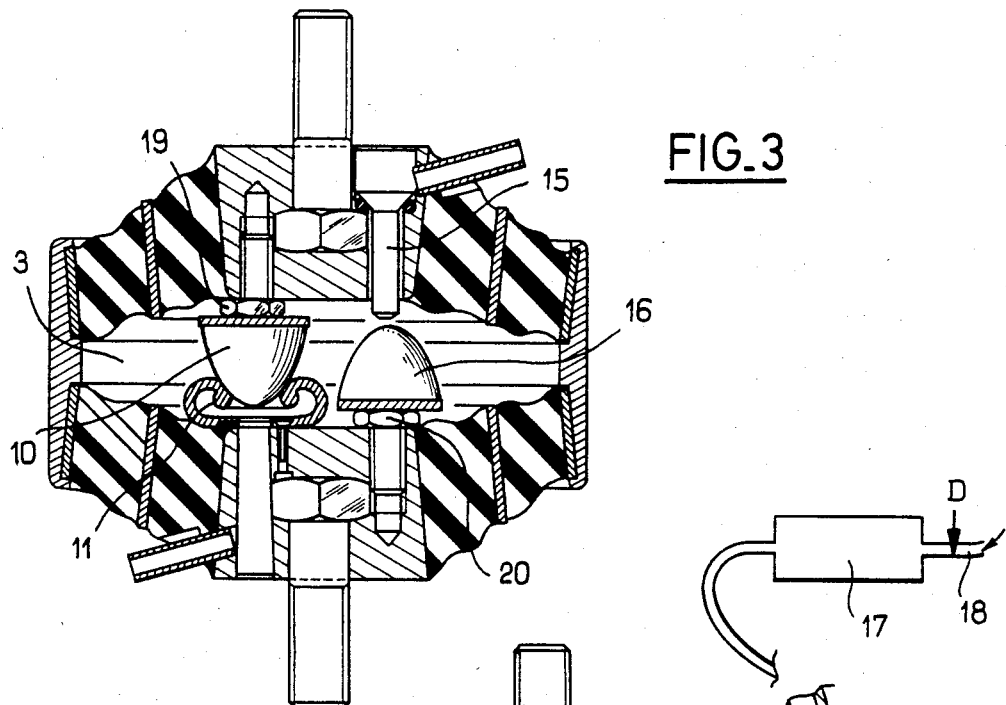
FIG. 3 is an actual cross sectional view of a truck cab vibration damping or insulation arrangement constructed in accordance with the present invention in a contracted position.

As shown in FIG. 3, if the arrangement of the present invention is utilized for a truck cab support, it is necessary, for purposes of occupant comfort, to require a flexibility that provides a true frequency on the order of 2 Hz with a load of 200–300 kg. Thus, there must be a considerable amount of absorption or damping in order to maintain the required comfort.

Figure 4:
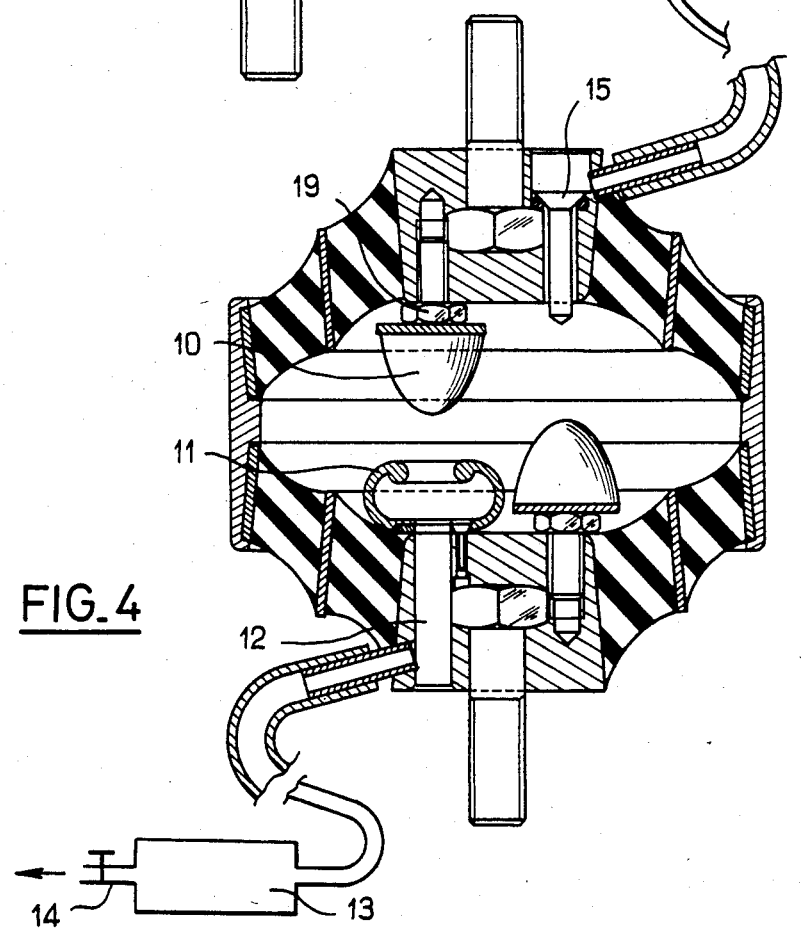
FIG. 4 is an axial cross sectional view of the arrangement of FIG. 3 in an expanded condition.
Figure 5:
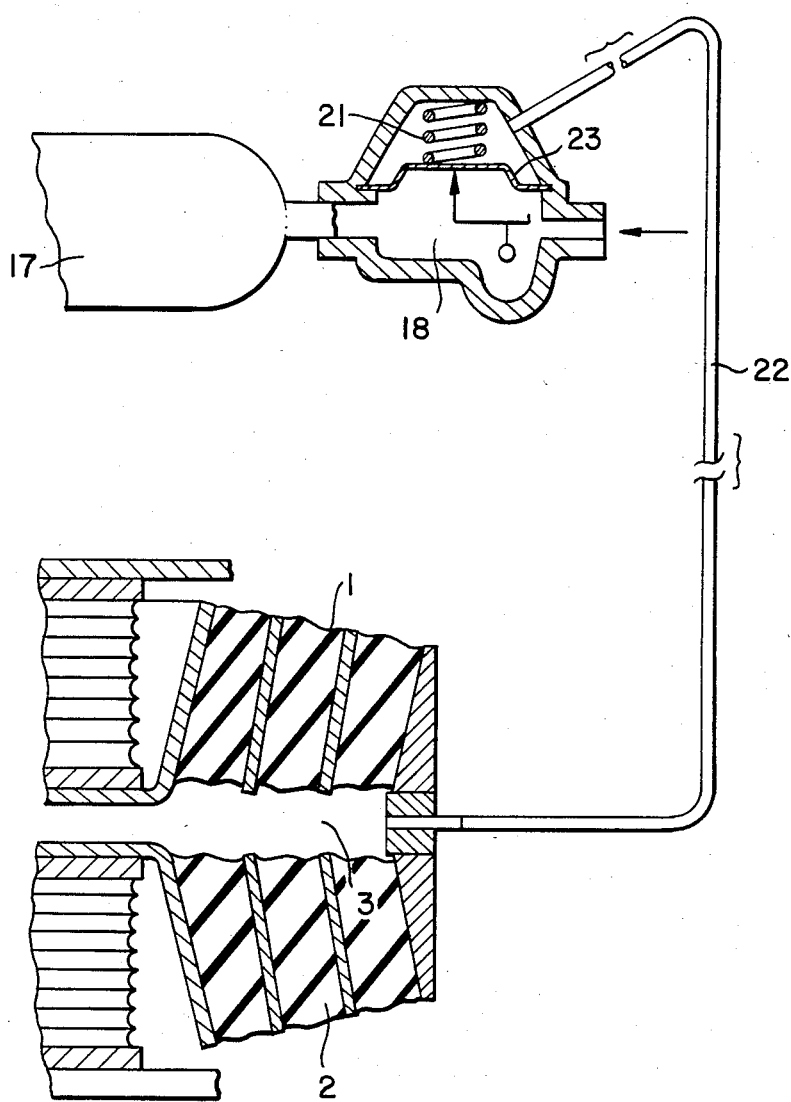
Figure 6:
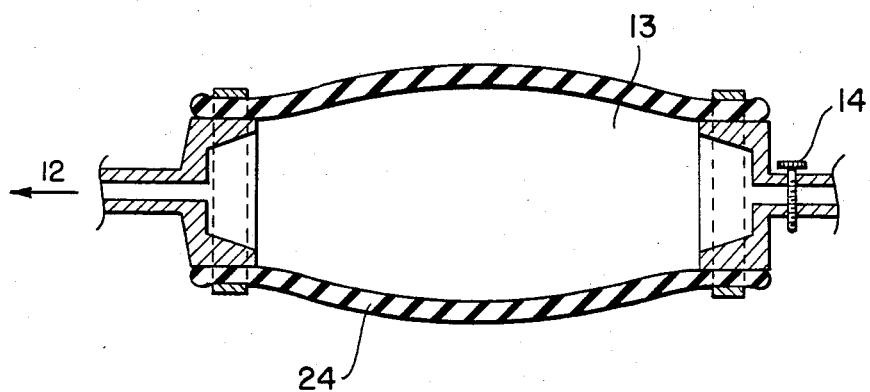
Figure 7:
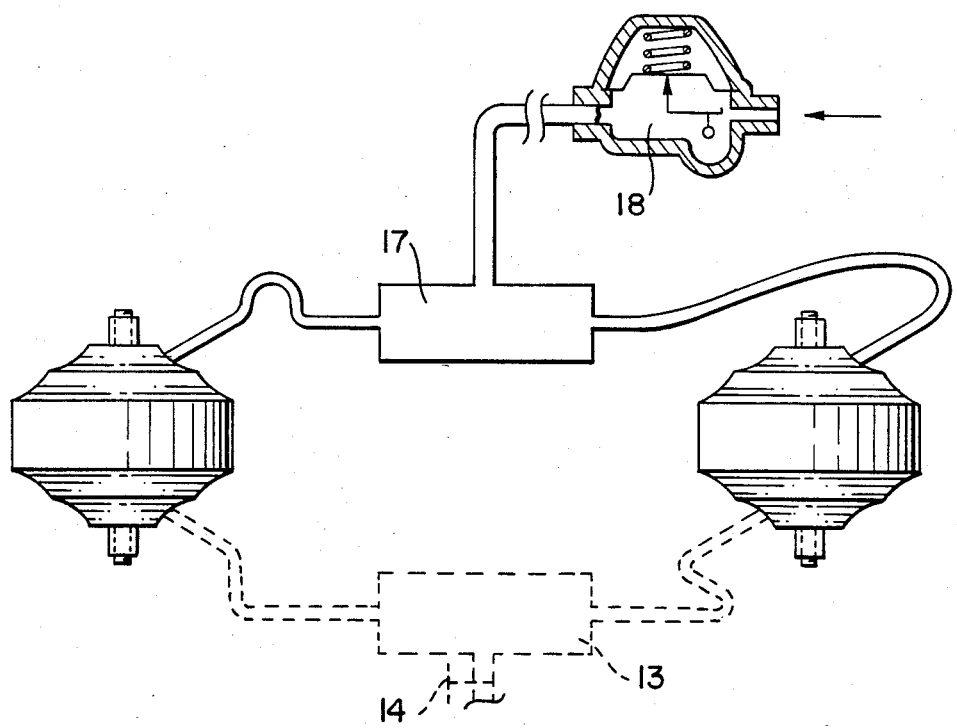

As shown in FIG. 4, when the support is in an expanded condition due to the fact that no load is applied thereto, a small conical stop or valve member 10 is detached from a sealing valve seat 11 so as to provide a full flow connection through the duct 12 to the additional enclosure 13 which was previously subjected to a zero pressure by a controlled leak of the pressure reducer 14, while the valve 15 remains closed. In the balance position of FIG. 3, the projection of the stop or valve member 10 in the sealing valve seat 11 closes the communication and, when stop or valve member 16 comes into contact with the valve 15, the valve rises and connects or communicates the enclosure 3 with the additional enclosure 17 which was previously subjected to a greater pressure through the pressure reducer 18. The static phase of the support can be regulated by adjustment of adjusting nuts 19, 20 cooperate with threaded portions of the stems of the stops 10, 16. With, for example, a cross section 80 cm$^2$, the support carries, for example, 215 kg distributed between a stress of 95 daN carried by the elastomer at a relative pressure of 1.5 bars in an inside of the variable volume chamber 3. It has been determined that pressures of 2 bar, to oppose the compression, or 1 bar to expose the expansion, may be provided using a simplified system of the additional enclosures and valves integrated into the variable volume chamber 3 of the rubber mount or support. One of the additional enclosures may, for example, have a volume of 0.5 dm$^3$ subjected to a pre-adjusted pressure of 3.2 bars of relative pressure through the pressure reducer which, if need be, may be integrated into the encasement or enclosure, while the other enclosure is approximately 2 dm$^3$, connected to the atmosphere through a port or opening capable of making a relative pressure drop of 1 bar in one second, which occurs during a rapid union between the active volume of the chamber 3 previously set at 1.5 bar and the latter previously set at a 0 bar pressure.

Given the slight pressure differentials, the stabilizing valve or regulator may be considerably simplified and integrated utilizing molded rubber components for the rubber mount and allowing for slight leaks. Another advantage of the present invention resides in the fact that the components are subjected to pressures of less than 4 bars and have a volume of less than 20 dm$^3$ and, consequently, would not be subject to regulations concerning gas pressure devices in, for example, France.

If the load to be carried varies greatly, the operation described above is not altered if the preadjusted pressure calculated at 3.2 bars to carry 215 kg is altered as a function of the load. Similarly, in dependence upon the needs or application, the combination between the left suspension and the right suspension of the vehicle and either of the additional enclosures 17 or 13 and/or both provide an anti-roll stability even if the balance pressure in each of the variable volume chambers 3 are slightly different when the loads are poorly centered.

While I have shown and described two embodiments in accordance with the present invention, it is understood that the same is not limited thereto but is susceptible of numerous changes and modifications as known to one having ordinary skill in the art and I therefore do not wish to be limited to the details shown and described herein, but intend to cover all such modifications as are encompassed by the scope of the appended claims.

I claim:

1. A pneumatic vibration insulation arrangement for a load, the arrangement comprising means defining a variable volume chamber means for supporting at least a portion of an air load, means for supplying a pressure to said variable volume chamber means for supporting a remainder of the load including first enclosure means providing a supply pressure to said variable volume chamber means, second enclosure means providing at least one of a modulated pressure or a pressure adapted to be slowly brought to atmospheric pressure to said variable volume chamber means, means for selectively communicating said first and second enclosure means with said variable volume chamber means in such a manner that upon establishing communication between the variable volume chamber means and at least one of the first and second enclosure means, a predetermined pressure is applied to said variable volume chamber means so as to provide for a predetermined vibration damping of the load.

2. A vibration insulation arrangement according to claim 1, wherein said means for defining the variable volume chamber means includes an encasement formed of thick walls of a rubber material.

3. A vibration insulation arrangement according to claim 2, further comprising reinforcement means disposed to said thick wall of rubber material.

4. A vibration insulation arrangement according to claim 1, wherein said means for defining the variable volume chamber means includes a pair of vertically juxtaposed encasement elements disposed so as to flexibly support the load.

5. A vibration insulation arrangement according to claim 1, wherein said means for selectively communicating includes at least one valve means arranged in an interior of the variable volume chamber means.

6. A vibration insulation arrangement according to claim 1, wherein said first enclosure means includes, in a wall thereof, a deformable member, the deformation of said member enabling a control of an adjustment of the supplied pressure.

7. A vibration insulation arrangement according to claim 6, wherein said second enclosure means includes, in a wall thereof, a deformable member which enables an elastic variation of the volume of the second enclosure means due to variation in pressure.

8. A vibration insulation arrangement according to claim 7, wherein the deformable member of the second enclosure means is fashioned of a cellular elastomer having a slight permeability over an entire surface thereof.

9. A vibration insulation arrangement according to claim 1, arranged in a vehicle suspension system, wherein at least one variable volume chamber means is disposed at a left and right side of the vehicle to provide for an anti-roll stability even if balance pressures in the variable volume chamber means are different due to a poor centering of the load.

10. A vibration insulation arrangement for a load, the arrangement comprising means defining a variable volume chamber means for supporting at least a portion of a load, means for supplying a pressure to said variable volume chamber means for supporting a remainder of the load including first enclosure means providing a supply pressure to said variable volume chamber means, second enclosure means providing at least one of a modulated pressure or a pressure adapted to be slowly brought to atmospheric pressure to said variable volume chamber means, means for selectively communicating said first and second enclosure means with said variable volume chamber means in such a manner that upon establishing communication between the variable volume chamber means and at least one of the first and second enclosure means, a predetermined pressure is applied to said variable volume chamber means so as to provide for a predetermined vibration damping of the load, and wherein said means for selectively communicating includes a first valve means interposed between the first enclosure means and the variable volume chamber means for controlling a supply of high pressure to the variable volume chamber means, and a second valve means interposed between variable volume chamber means and the second enclosure means, and wherein a stop means is disposed in the variable volume chamber means for controlling a positioning of the first valve means.

11. A vibration insulation arrangement according to claim 10, wherein said second valve means includes a valve stop means displaceable toward and away from a fixed valve seat means.

12. A vibration insulation arrangement according to claim 1, wherein a pressure reducer means is provided for adapting the predetermined pressure in the first enclosure means to a variable load supported by the insulation arrangement.

13. A vibration insulation arrangement according to claim 1, wherein means are provided for controlling a pressure of the second enclosure means.

* * * * *